(12) United States Patent
Fluhrer et al.

(10) Patent No.: US 9,304,049 B2
(45) Date of Patent: Apr. 5, 2016

(54) TEMPERATURE MEASURING DEVICE, ELECTRIC APPLIANCE HAVING SUCH A TEMPERATURE MEASURING DEVICE AND METHOD FOR TEMPERATURE MEASURING

(71) Applicant: E.G.O. Elektro-Geraetebau GmbH, Oberderdingen (DE)

(72) Inventors: Henry Fluhrer, Bretten (DE); Gerd Knappe, Bretten (DE); Ewald Bayer, Dormettingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 353 days.

(21) Appl. No.: 13/894,196

(22) Filed: May 14, 2013

(65) Prior Publication Data

US 2013/0308684 A1    Nov. 21, 2013

(30) Foreign Application Priority Data

May 15, 2012   (DE) .......................... 10 2012 208 125

(51) Int. Cl.
| | | |
|---|---|---|
| *G01C 21/00* | (2006.01) | |
| *G01K 1/00* | (2006.01) | |
| *G01K 13/12* | (2006.01) | |
| *G01K 7/18* | (2006.01) | |
| *G01K 7/20* | (2006.01) | |
| *G01K 7/22* | (2006.01) | |

(52) U.S. Cl.
CPC *G01K 7/18* (2013.01); *G01K 7/206* (2013.01); *G01K 7/22* (2013.01); *G01K 2207/06* (2013.01)

(58) Field of Classification Search
None
See application file for complete search history.

(56) References Cited

U.S. PATENT DOCUMENTS

| | | | |
|---|---|---|---|
| 3,728,702 A | | 4/1973 | Miyamoto et al. |
| 4,314,666 A | * | 2/1982 | Schotten ................. 236/78 R |
| 5,171,091 A | * | 12/1992 | Kruger et al. ................ 374/183 |
| 5,713,668 A | | 2/1998 | Lunghofer et al. |
| 7,310,213 B2 | * | 12/2007 | Takada ......................... 361/103 |
| 7,675,006 B2 | * | 3/2010 | Jeong ............................ 219/494 |
| 8,483,987 B2 | * | 7/2013 | Terao ............................ 702/117 |
| 8,689,608 B2 | * | 4/2014 | Nakano et al. ............... 73/25.03 |
| 2004/0004994 A1 | * | 1/2004 | Wu et al. ....................... 374/170 |

(Continued)

FOREIGN PATENT DOCUMENTS

| | | |
|---|---|---|
| DE | 2060610 A1 | 6/1971 |
| DE | 4343747 A1 | 6/1994 |

(Continued)

OTHER PUBLICATIONS

German Patent and Trade Mark Office, Office Action for Application No. DE 102012208125.9, Feb. 18, 2013, 5 pages, Germany.

(Continued)

*Primary Examiner* — Peter Macchiarolo
*Assistant Examiner* — Jermaine Jenkins
(74) *Attorney, Agent, or Firm* — Alston & Bird LLP (57) ABSTRACT

A temperature measuring device for an electric appliance such as a fryer includes at least one temperature sensor in the form of an electric resistor, to which at least two different measuring voltages can be applied with cyclic switching between the measuring voltages. The temperature sensor is connected to a control, which includes a microcontroller and which is configured for applying at least two different measuring voltages to the temperature sensor.

19 Claims, 6 Drawing Sheets

(56) References Cited

U.S. PATENT DOCUMENTS

| | | |
|---|---|---|
| 2010/0198546 A1 | 8/2010 | Kamata |
| 2012/0063488 A1 | 3/2012 | Nakayama et al. |
| 2013/0215056 A1* | 8/2013 | Johansson et al. ............ 345/173 |

FOREIGN PATENT DOCUMENTS

| | | | |
|---|---|---|---|
| DE | 4312394 | A1 | 10/1994 |
| DE | 4312395 | A1 | 10/1994 |
| DE | 69733138 | T2 | 2/2006 |
| DE | 102004035014 | A1 | 2/2006 |
| DE | 202009003889 | U1 | 7/2009 |
| EP | 2428781 | A1 | 3/2012 |
| JP | 2010243354 | A | 10/2010 |

OTHER PUBLICATIONS

European Patent Office, Extended European Search Report for Application No. 13167708.0, Dec. 19, 2014, 8 pages, Germany.

* cited by examiner

TEMPERATURE MEASURING DEVICE, ELECTRIC APPLIANCE HAVING SUCH A TEMPERATURE MEASURING DEVICE AND METHOD FOR TEMPERATURE MEASURING

CROSS-REFERENCE TO RELATED APPLICATIONS

This application claims priority to German Application No. 10 2012 208 125.9, filed May 15, 2012, the contents of which are hereby incorporated herein in its entirety by reference.

TECHNOLOGICAL FIELD

The invention relates to a temperature measuring device for an electric appliance, for example a cooking appliance such as a fryer, as well as to such an electric appliance having a temperature measuring device and to a method for temperature measuring by means of such a device.

BACKGROUND

In electric appliances having temperature measuring, such as for example the aforementioned cooking appliances, the temperature measuring can be very relevant in terms of security, in particular in the case of the aforementioned fryers. Temperature sensors are intended to prevent an excessive temperature, which presents an accident hazard. In that context, temperature sensors can have malfunctions, for example due to manufacturing errors in the measuring resistor, due to aging or other types of damage.

It is known from U.S. Pat. No. 5,713,668 that, so to say, a temperature sensor prefers self-testing in the temperature measuring device and that two thermocouples and one resistance sensor are provided for this purpose.

Further temperature measuring devices are known from DE 10 2004 035 014 A1 and DE 20 2009 003 889 U1.

BRIEF SUMMARY

The object underlying the present invention is to provide an aforementioned temperature measuring device, an electric appliance provided therewith as well as a method for temperature measuring using such a temperature measuring device, by means of which problems of the prior art can be prevented, and in particular a secure and exact temperature measuring is possible due to simple construction as well as easy evaluation.

The object is achieved by a temperature measuring device, by an electric appliance as well as by a method. Advantageous as well as preferred embodiments of the invention are the subject of the further claims and will be explained in more detail in the following. Here, some of the features named in the following are only described in connection with the temperature measuring device, the appliance or the method. However, independently thereof, they should be applicable to the temperature measuring device, the electric appliance as well as to the method. The wording of the claims is incorporated into the content of the description by explicit reference.

It is provided that the temperature measuring device comprises at least one temperature sensor as electric resistor. Said temperature sensor is applied with at least two different measuring voltages, wherein it is switched over between the measuring voltages, advantageously by cyclic or periodical switching. In a particularly advantageous configuration, measuring is achieved with both measuring voltages in each case for a similar time period or the same time period. The temperature sensor is connected to a control which comprises a microcontroller, and which is furthermore configured as to apply the temperature sensor with the at least two different measuring voltages. In this case, a temperature sensor can directly be connected to an input of the microcontroller.

Here, the microcontroller can calculate the difference between the different measuring voltages, wherein said microcontroller comprises an internal memory. On the one hand, a desired difference-characteristic to be expected is stored in said memory, the microcontroller comparing said characteristic to the difference measured, and on the other hand, correction parameters are stored, by means of which the microcontroller then calculates the actual temperature by means of the difference of the measuring voltages.

By means of said application with two different measuring voltages, it is achieved that determination of the so-called self-heating is quasi improved. Namely, the temperature sensor is subject to self-heating as a result of the measuring voltage applied, which heating adds to the actual ambient temperature. For an exact temperature measuring, said self-heating is to be subtracted, which is advantageously effected in the microcontroller. During operation with two different measuring voltages for the resistance sensor, the actual temperature to be measured is superimposed with a self-heating characteristic which varies according to the measuring voltages applied. The amplitude of the self-heating depends on the temperature to be measured or the environment of the temperature sensor besides the measuring current. At low temperatures to be measured the amplitudes or the deflection of the self-heating characteristic are greater and at high temperatures correspondingly smaller. Between the actual temperature characteristic T or the temperature to be measured and the measured temperature characteristics T1 and T2, there is a functional relation $T=f(T1, T2)$ or $\Delta T2=f(\Delta T1)$, the parameters of which are stored in the memory of the microcontroller and therefore T can be calculated exactly. Furthermore, an expected value of the difference temperature $\Delta T1$ can be deduced from the difference of measuring voltages $U_{ref1}$ and $U_{ref2}$ which will be explained in the following. The expected values of the difference temperature characteristic are saved in the microcontroller. Now, if the measured temperature characteristic, i.e. including the self-heating, is correspondingly re-measured, a deduction can be made that on the one hand, the temperature sensor in the given environment and on the other hand also the related evaluation or circuit, respectively, perform correctly.

A heating characteristic in the in each case specific assembling and operating situation of the temperature sensor can for example be detected on the main states of room temperature and maximum temperature for the operation in a so-called master device, i.e. as a reference, so to say. Said heating characteristic is then saved in the memory of the microcontroller as desired temperature characteristic, which corresponds to an expected value, and serves as a reference value for a subsequent plausibility test with the actually measured temperature characteristic during use. If a comparison between said expected value or the desired temperature, respectively, is implausible or if there are excessive deviations that are too great, the microcontroller puts a security function into effect and a heating device or the like is switched-off, maybe even the entire electric appliance, where required. Such a plausibility test is conducted especially when only small temperature movements are detected, i.e. when the temperature to be measured at the temperature sensor is approximately settled.

In an advantageous embodiment of the invention, a redundant design can be provided, i.e. at least two temperature sensors are provided with in each case a distinct electric resistor. On the one hand, this increases the reliability and on the other hand reference measuring for increased security can be conducted, as will be explained in the following. In an advantageous configuration, the temperature sensors are different or not identical. A first option therefor is to use temperature sensors of different manufacturers, even if said sensors are similar or work according to the same principle. A second option is that the temperature sensors or the electric resistances thereof have in each case different resistance values. Thus, an obligatory result are different characteristics at each sensor or only the voltage characteristics are different, respectively. And thus, systematic errors can be prevented, if both seem to be working correctly. When using two identical resistance sensors with equal values, the same production technology and the same production batches, it is disadvantageous that a temperature distortion due to aging and/or drift is not detected, since both sensors are "aging" in the same way, so to say. To prevent such problems, resistance sensors from different batches can be selected if purchased from the same manufacturer.

According to yet another option, the temperature sensors can have different characteristics, in particular in terms of a temperature dependency of the resistance value. They can be significantly different in terms of temperature sensitivity, for example at least by the factor 2.5 or even 10. As an alternative, at least one of the electric resistors of the two temperature sensors is a non-linear resistor and the other one is a linear resistor, for example one of them a negative temperature coefficient (NTC) resistor or a positive temperature coefficient (PTC) resistor and the other one a platinum thin film (PT) resistor. By means of said significantly different configuration, errors can also be prevented and evaluation accuracy and reliability can be increased. Preferably, an NTC sensor and a PT sensor are used, for example a PT1000 sensor.

In the method involving two temperature sensors, one option is to apply one of said sensors with the afore described alternating measuring voltage, and the other sensor only with a single, constant measuring voltage, that quasi for exact temperature detection. A plausibility test can be achieved in the microcontroller provided both temperature characteristics are compared and the difference thereof is an alternating heating characteristic.

In yet another embodiment of the invention, different series resistors can be provided upstream of the temperature sensors or the resistors thereof, for increasing operational safety.

In yet another embodiment of the invention, a reference resistor for a temperature sensor can be provided, which advantageously is also an electric resistor. For example, said resistor can correspond to the aforementioned other temperature sensor which is not operated with alternating measuring voltage. As an alternative, such a reference resistor can serve as reference value for the temperature sensor. Here, additionally it is possible that multiple different reference resistors are provided and that a corresponding switching device is present to switch between the different reference resistors. Then, the temperature can be measured at multiple resistors or a plausibility for the temperature measured at the temperature sensor can be obtained.

In a further embodiment of the invention, a circuit of the device can comprise an integration capacitor, an electric resistor as the aforementioned temperature sensor, a reference resistor or the aforementioned series resistor and a counting circuit for the temperature measuring circuit. This will be explained in more detail in the following.

In yet another embodiment of the invention, a multiplexer is present or integrated in the control for the temperature sensor or in a microcontroller, respectively. As a result, multiple temperature sensors or measuring resistors can be evaluated. As a result, also a measuring range switching is possible, for example.

Thus, the measuring device can work in a self-sustaining manner, i.e. it can be operated without integrated temperature control. Then, information on a predefined heating capacity at the appliance or the expected value, respectively, is missing.

In the case of devices for industrial kitchens and restaurants, a self-diagnosis as DC (diagnostic coverage) is required for the safety electronics. In the case of an electronic system of the temperature measuring device which comprises a safety electric system and a temperature controller, i.e. which comprises two channels, a conclusion can be made as to the plausibility of the measured temperature value by means of the supplied heating power through the temperature controller. If the safety electronics is operated in a self-sustaining manner, i.e. without information from the temperature controller or that is to say with only one channel, respectively, said deduction is not possible. Therefore, in the present case the diagnosis of the temperature sensor is to be effected by means of the two measuring voltages. Thus, the major focus is not so much on the advantage that a more simple measuring circuit can be constructed, but on the realization of the self-diagnosis in the case of safety electronics that is operated in a self-sustaining manner, i.e. without information from the temperature controller.

Advantageously, a memory is provided, for example in the control or advantageously in the microcontroller, in which memory at least a desired temperature characteristic to be expected for the temperature sensor is stored, which characteristic shall apply during operation of the electric appliance. In this case, the temperature measuring device or the microcontroller is configured as to compare the actual temperature characteristic measured using the temperature sensor to the stored desired temperature characteristic. As a result, the present temperature can be determined and in particular, the presence of an excessive temperature can be detected, whereupon the appliance should be switched off.

Advantageously, such an appliance is provided, as mentioned above, with an electric heating device which can be effective in a space to be heated, which space can for example be an oven muffle of a baking oven or an oil basin of an aforementioned fryer. In the space to be heated, a medium to be heated can be present, such as fryer fat in the case of the fryer.

In yet another embodiment of the invention, a deduction can be made to the absolute temperature based on the aforementioned situation that the amplitude of the self-heating is greater or smaller depending on the temperature to be measured. For this purpose, said amplitude is calculated and the absolute temperature is determined by means of reference values which advantageously are stored in the microcontroller or the control, respectively. Verification of the measured temperature values can also be based thereon.

These features and further features arise not only from the claims but from the description and the drawings, wherein the individual features can be realized in each case on their own or in sub-combinations thereof in an embodiment of the invention and in other fields and can represent advantageous embodiments protectable per se, for which protection is hereby claimed. The division of the application into individual sections as well as cross headings does not limit the general validity of the statements made therein.

BRIEF DESCRIPTION OF THE SEVERAL VIEWS OF THE DRAWINGS

Exemplary embodiments of the invention are schematically shown in the drawings and will be explained in more detail in the following. The drawings show in.

DETAILED DESCRIPTION

Figure 1:
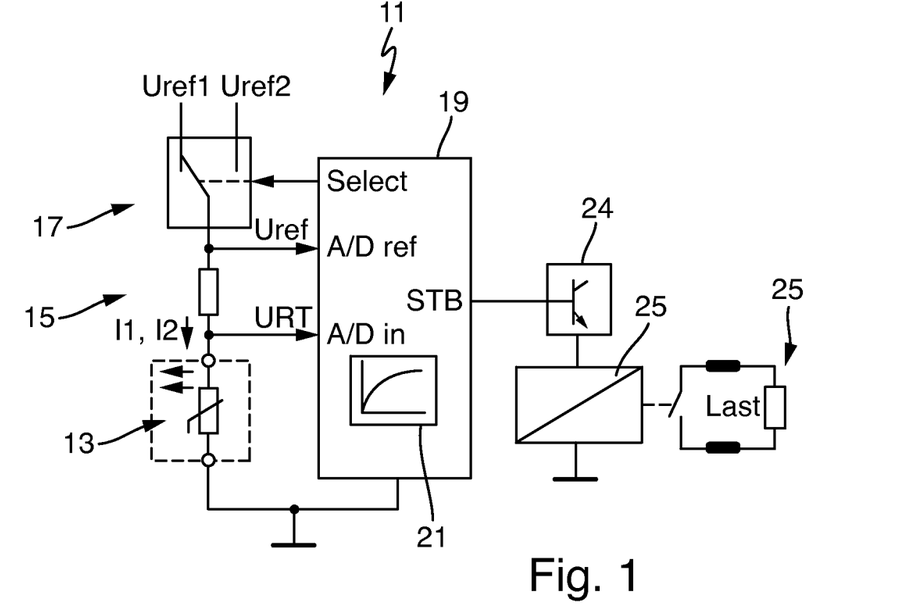
FIG. 1: a circuit concept for the temperature measuring device according to a first embodiment of the invention, FIG. 2a-c characteristics of the temperature plotted against the time during a heating procedure in different illustrations, FIG. 3 an embodiment of the circuit concept of FIG. 1, FIG. 4 characteristics of the voltage plotted against the time at the temperature sensor against the weight in the case of two measuring voltages, FIG. 5 an alternative embodiment of a circuit concept with two temperature sensors and a multiplexer towards the microcontroller in an arrangement similar to FIG. 1, FIG. 6 an embodiment of the circuit concept of FIG. 5, FIG. 7 an illustration of the voltage of the temperature sensors plotted against the weight as a function of time, FIG. 8 yet another alternative embodiment of a circuit concept with multiplexer integrated in the microcontrollers, FIG. 9 the characteristic of the input voltage of the microcontroller plotted against the time in the circuit concept according to FIG. 8, and FIG. 10 a fryer as electric appliance according to the invention with a heating device and a temperature sensor for monitoring of the latter including a temperature measuring device according to FIG. 1.

In FIG. 1, a general circuit concept according to the invention for a temperature measuring device 11 in a first general embodiment of the invention is shown. The temperature measuring device 11 comprises a temperature sensor 13, in the present case a temperature dependent resistor, which can form the temperature detector shown with the dashed line. A series resistor 15 is connected upstream of the temperature sensor 13, and upstream of said resistor in turn a switch 17 is connected, which is controlled via a select output terminal of a microcontroller 19. The switch 17 switches between two measuring voltages $U_{ref1}$ and $U_{ref2}$. The respective measuring voltage is supplied to one of the input terminals of the microcontroller 19 prior to the series resistor 15, and also the voltage via the temperature sensor 13. $U_{RT}$ is the temperature-dependent voltage, which results from the scaling factor of the series resistor 15 and the resistance value of the temperature sensor 13. At the same time, the voltage $U_{ref}$ is the operational voltage or supply voltage of the voltage divider 15 and 13, by means of which the current $I_1$ and $I_2$ is predetermined. The self-heating of the temperature sensor 13 depends on the magnitude of the current $I_1$ or $I_2$, which is predefined by means of the switching-over of $U_{ref1}$ and $U_{ref2}$ via the output Select and the switch 17. When switching over the switch 17, the voltage ratio between $U_{ref}$ and $U_{RT}$ remains the same, and thus also the measuring result of $U_{RT1}$ of the analog to digital (AD) converter in the microcontroller 19.

In the microcontroller 19, a memory 21 is provided inter alia, in which certain temperature characteristics to be expected or desired temperature characteristics are stored for the temperature sensor 13 or the temperature measuring device 11. One output safety temperature limiter (STB) of the microcontroller 19 leads to a transistor 24 as a switch, which in turn controls a relay 25 for switching of loads. Thereby, a heating device 27 is controlled or switched on and off, which in this case is shown as a heating resistor, and more details will be given on that with respect to FIG. 10.

Figure 10:
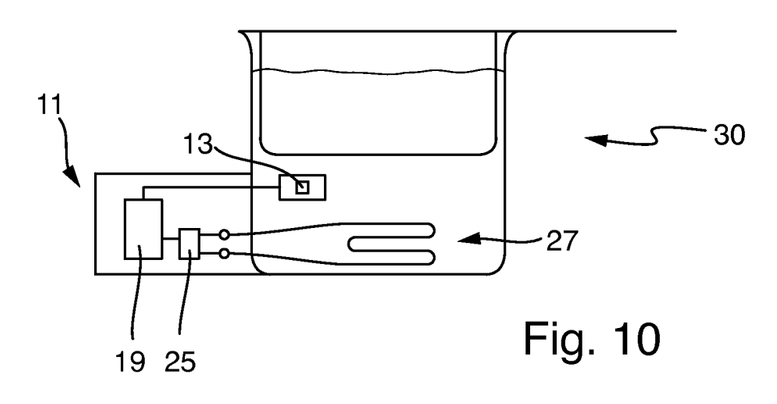

In FIG. 10, a fryer 30 is shown as an exemplary electric appliance, which comprises the temperature measuring device 11. The heating device 27 is located in the interior of the fryer 30, in this case shown in an exemplary manner as conventional tubular heating element. Said element is, corresponding to FIG. 1, controllable by means of the relay 25, which in turn is controlled by the microcontroller 19.

Furthermore, a temperature detector or temperature sensor 13 of the temperature measuring device 11 is arranged in the fryer 30. Said temperature sensor 13 detects the temperature in the fryer 30 or the fryer fat therein in order to prevent an overheating due to the heating device 27.

Figure 2A:
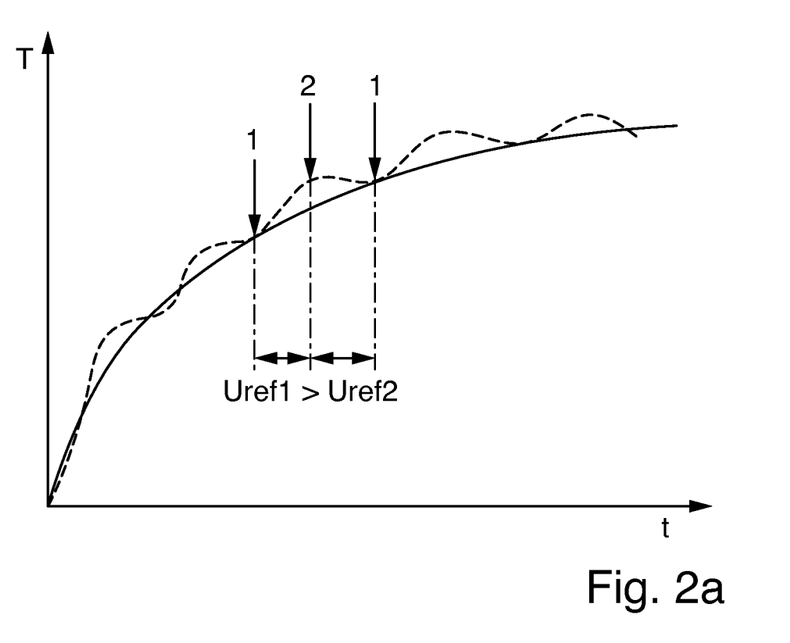

In FIG. 2a, the characteristic of the temperature T is plotted against the time t. The solid line shows the actual temperature characteristic at the location of the temperature sensor 13, if said sensor would not be operated. The dashed line shows the temperature in the temperature sensor 13, which has the afore described wave-type characteristic with the different amplitudes due to the different measuring voltages. Said wave-type curve is shown on its own in FIG. 2b as a solid line. At the measuring time 1, a temperature measuring at the temperature sensor 13 is conducted with a first measuring voltage $U_{ref1}$ in that the switch 17 controlled by the microcontroller 19 applies said measuring voltage $U_{ref1}$ to the temperature sensor 13 via the series resistor 15. Then, at the measuring time 2, the switch 17 is changed over and the measuring voltage $U_{ref2}$ is applied to the temperature sensor 13. Since the measuring voltage $U_{ref1}$ is greater than the measuring voltage $U_{ref2}$, the increase of the temperature in the temperature sensor 13 between measuring time 1 and measuring time 2 is slightly more pronounced.

Figure 2B:
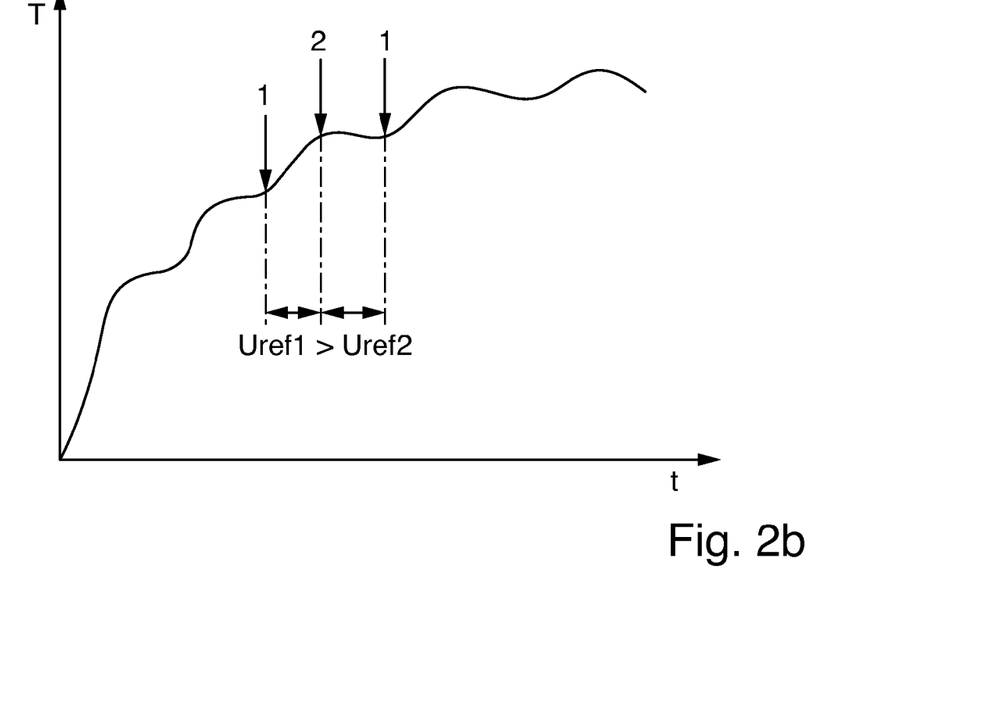

Then, as from measuring time 2 the characteristic of the temperature is detected up to the new measuring time 1 by means of the measuring voltage $U_{ref2}$. Since the second measuring voltage $U_{ref2}$ is smaller now, the temperature slightly decreases again from measuring time 2 up to the measuring time 1 Thus, at measuring time 1 in each case the actual temperature can be measured, as the case may be with an aforementioned correction value. At measuring time 2 a check measuring is effected. Here, the temperature must be higher than at measuring time 1 therebefore and thereafter, that is, in turn, when measuring is conducted with the slightly lower measuring voltage $U_{ref2}$. This is the aforementioned plausibility test in the temperature measuring device 11.

Figure 2C:
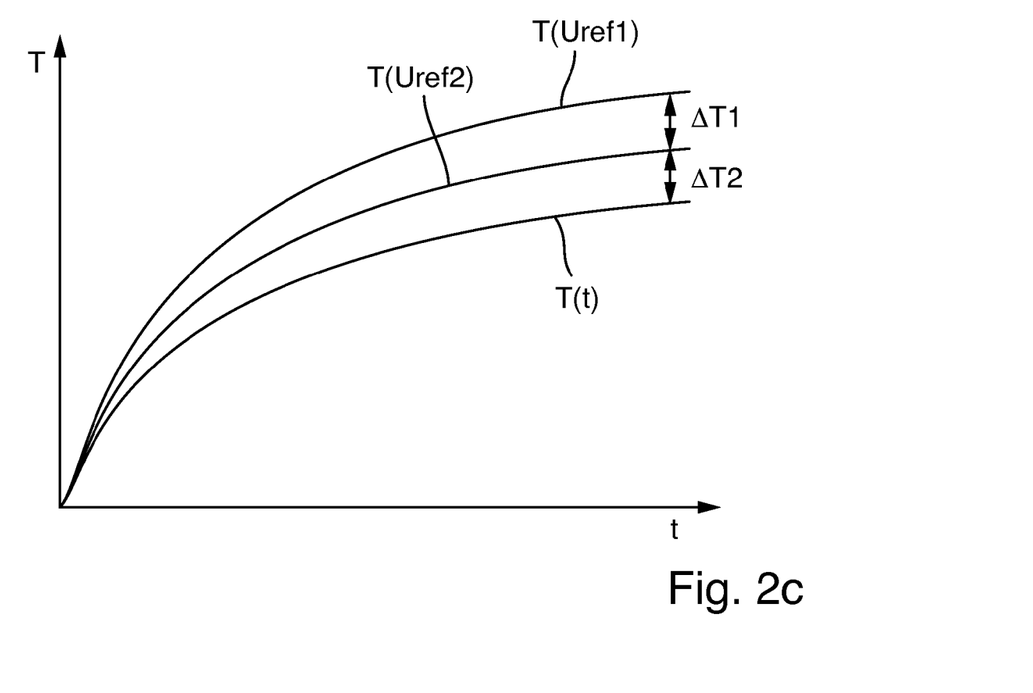

FIG. 2c shows the characteristics of the temperatures, wherein the lowermost characteristic is that of FIG. 2a. The temperature characteristic in the middle is that at $U_{ref2}$, and the uppermost characteristic is that at $U_{ref1}$. The temperature difference between the two upper curves is ΔT1 and that between the two lower characteristics is ΔT2, see also the comments mentioned above.

Figure 3:
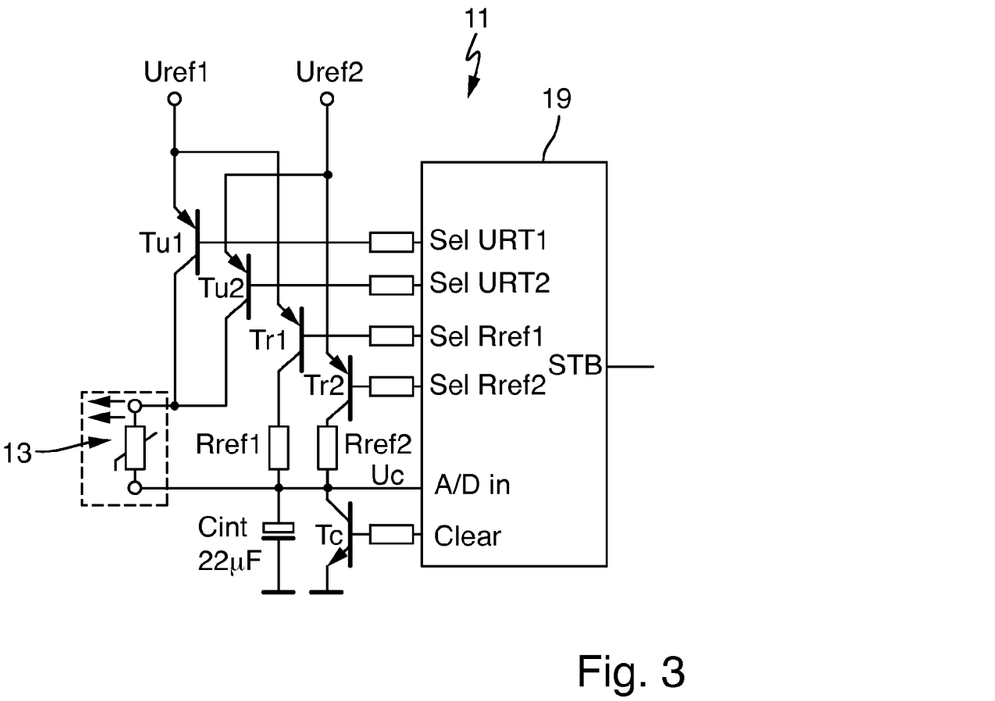

FIG. 3 shows the implementation of the circuit concept of FIG. 1 in practice. The switch 17 is replaced by the transistors $T_{u1}$ and $T_{u2}$ as well as $T_{r1}$ and $T_{r2}$. Said four transistors are in each case switched by corresponding output terminals of the microcontroller 19. The transistors $T_{r1}$ and $T_{r2}$ control the respective measuring voltage at the input terminal of the microcontroller 19 via resistors $R_{ref1}$ and $R_{ref2}$. Furthermore, a capacitor $C_{int}$ is provided for the conversion times as well as a transistor $T_C$. Via a discharge switch $T_C$, the integration capacitor $C_{int}$ is discharged for a time period $t_{clear}$. Then, $U_{ref1}$ via $T_{r1}$ is switched through and $C_{int}$ is charged up to a predefined voltage threshold value $U_c(R_{ref1})=U_1$ via the reference resistor Rref1. The charge time t1 is stored in the microcontroller 19.

After the discharge, $U_{ref1}$ is switched through via $T_{u1}$ and $C_{int}$ is charged via the temperature sensor 13 until reaching the voltage threshold value $U_c(R_{RT})=U_1$. The charge time t2 is also stored in the microcontroller 19. The temperature dependent re4sistance of the temperature sensor 13 can now be calculated in the microcontroller 19 by means of the ratio $R_{ref1}* t2/t1$. The same procedure is applied to branch $U_{ref2}$ and $R_{ref2}$, that is, the second measuring voltage.

Figure 4:
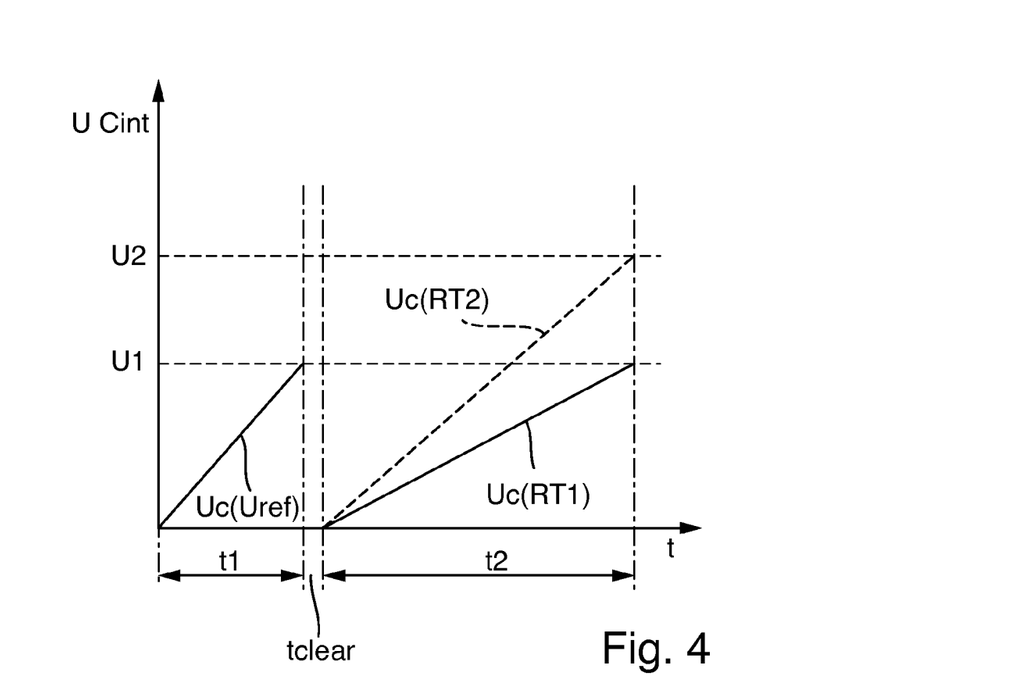

In FIG. 4, the characteristic of the voltage at the input terminal of the microcontroller 19 is shown, namely for both the two voltages $U_1$ and $U_2$ and during the respective measuring times $t_1$ and $t_2$.

In fact, for a constant voltage at the input terminal of the microcontroller 19 the resistance value of the temperature sensor 13 performs as the resistance value of the respective reference resistor $R_{ref1}$ or $R_{ref2}$ multiplied by the ratio of measuring time 2 to measuring time 1. If the capacitor $C_{int}$ is selected with 22 μF and if a PT1000 is used as temperature sensor 13, a switch threshold of 54 ms results at 400° C.

Figure 5:
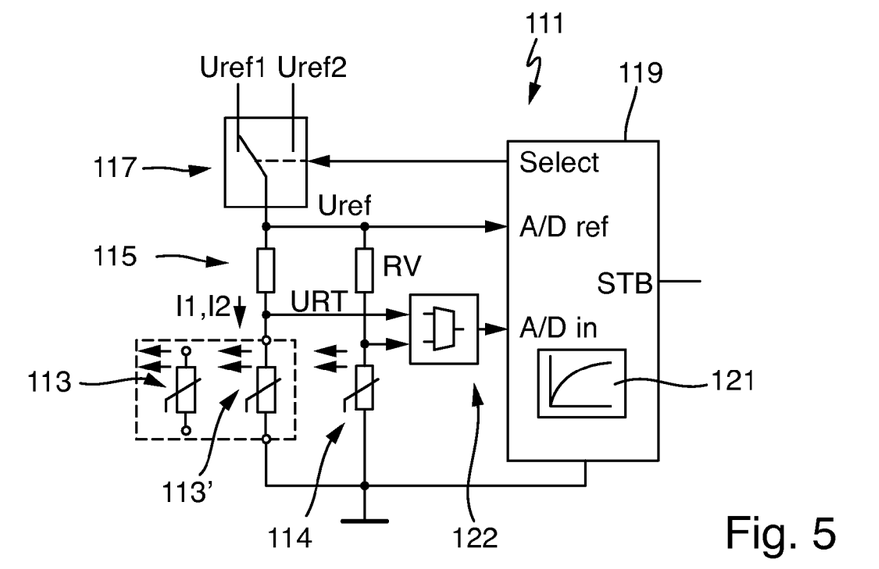

The alternative general circuit concept of FIG. 5 for the temperature measuring device 111 shown there comprises a first temperature sensor 113 and a second temperature sensor 113'. Said two temperature sensors can be summed up by means of a single temperature detector shown with a dashed line and, according to FIG. 10, can be arranged in the fryer, advantageously also in a spatial vicinity to one another, in order to measure the same temperature.

According to FIG. 1, a series resistor 115 and a switch 117 are provided for two measuring voltages $U_{ref1}$ and $U_{ref2}$. Again, the switch 117 is switched by the microcontroller 119 which also contains a memory 121. According to FIG. 1, a switchable heating device extends adjacently at the right side of the STB output of the microcontroller 119, which heating device however is not shown here for reasons of clarity.

The temperature measuring device 111 comprises yet another room temperature sensor 114, which also comprises a temperature-dependent resistance value. It serves for counterchecking of the values of the temperature sensor 113 by means of determination of the room temperature. The voltages with the temperature sensors 113 and 114 are supplied via a multiplexer 122 to the respective input terminal of the microcontroller 119.

The two temperature sensors 113 and 113' form a sensor pair, which is arranged together in the temperature detector initially in an electrically non-connected manner. Each temperature measuring must be detected separately. The room temperature sensor 114 serves as a reference resistance sensor by means of which a calibration and a performance check of the temperature sensors 113 and 113' can be conducted. For that purpose, said sensor can be assigned to a same component carrier as the other circuit components, for example as the microcontroller 119. The multiplexer 112 serves for switching over the individual sensors 113, 113' and 114 and can also be a part of the microcontroller 119.

Figure 6:
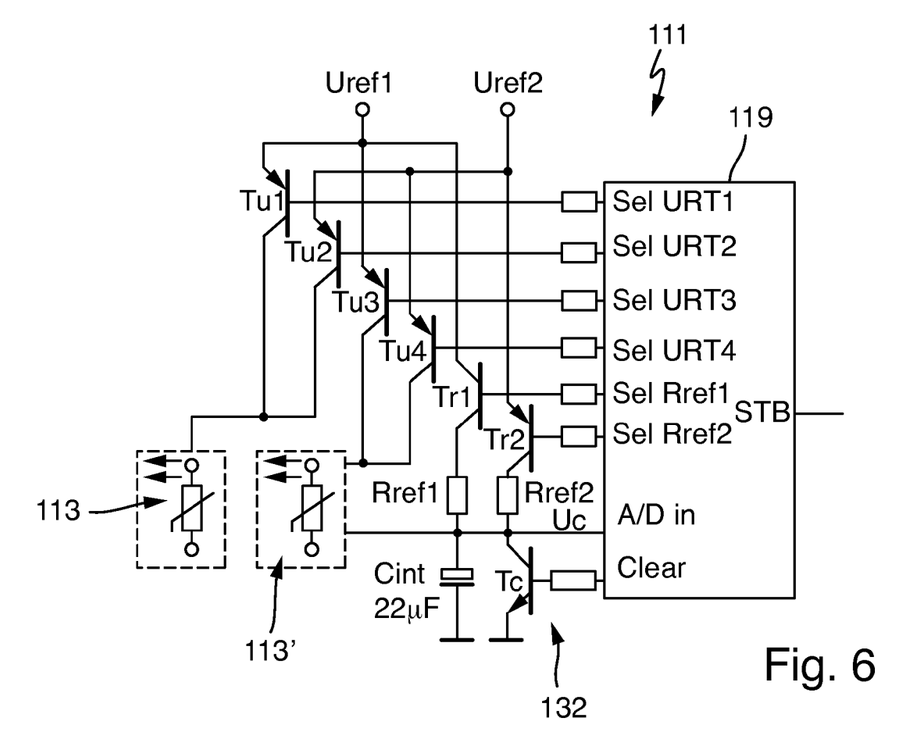

Corresponding to FIG. 3, FIG. 6 shows the implementation of the circuit concept of the temperature measuring device 111 in practice. In this case, corresponding to FIG. 3, yet two further transistors $T_{u3}$ and $T_{u4}$ are provided for the second temperature sensor 113'. For the temperature sensor 113', merely in each case one additional transistor branch with the transistors $T_{u3}$ and $T_{u4}$ is required.

Figure 7:
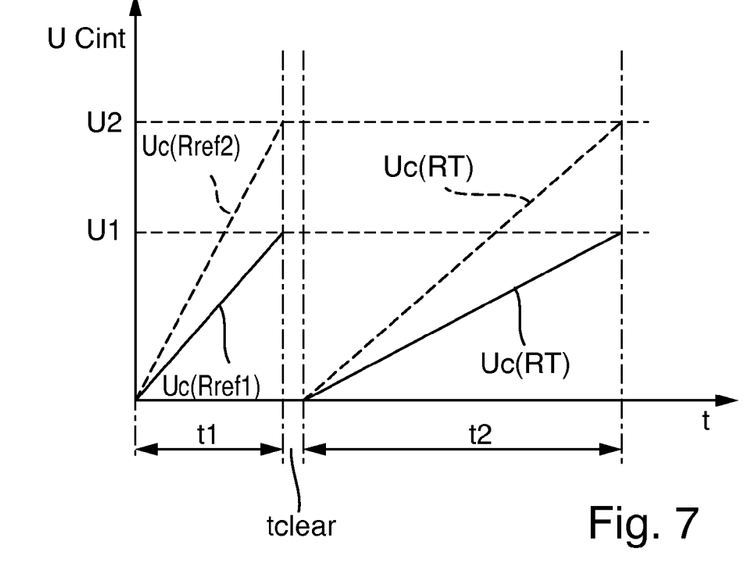

In FIG. 7, the corresponding time characteristic of the voltage at the input terminal of the microcontroller 119 during the two measuring times t1 and t2 is shown according to FIG. 4.

Figure 8:
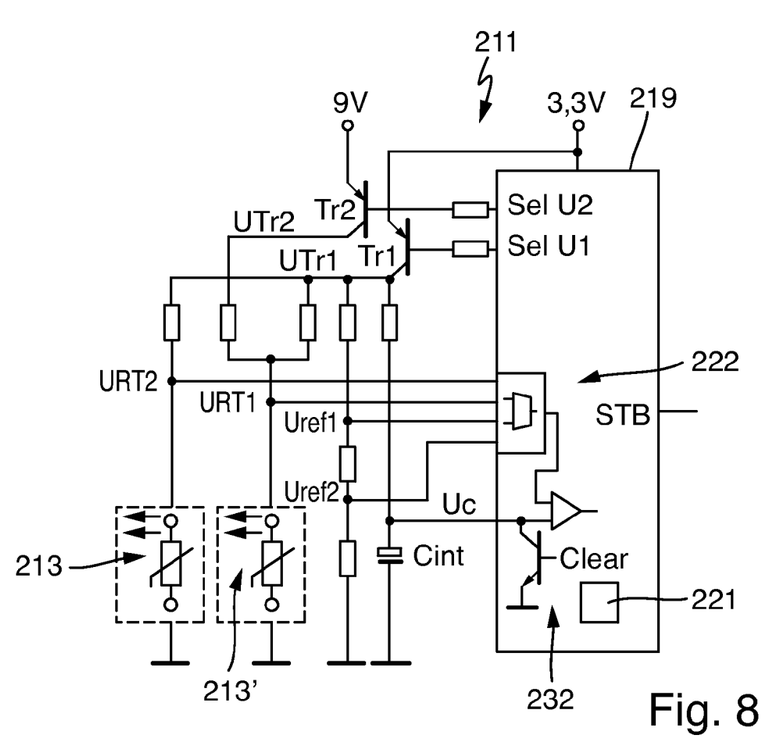

In the yet further alternative embodiment according to FIG. 8 for a temperature measuring device 211, similar as in FIG. 6, two temperature sensors 213 and 213' are provided. They are supplied with measuring voltages via transistors $T_{r1}$ and $T_{r2}$, namely 9 V and 3.3 V. In the microcontroller 219, besides a memory 221, a multiplexer 222 is integrated as well as a further transistor 232 including an internal operation (OP) amplifier. Again, a connected heating device including switches according to FIG. 1 is not shown. Both the multiplexer 222 for switching the sensor voltages $U_{ref1}$ and $U_{ref2}$ and the discharge switch 232 can be integrated in the microcontroller 219.

Figure 9:
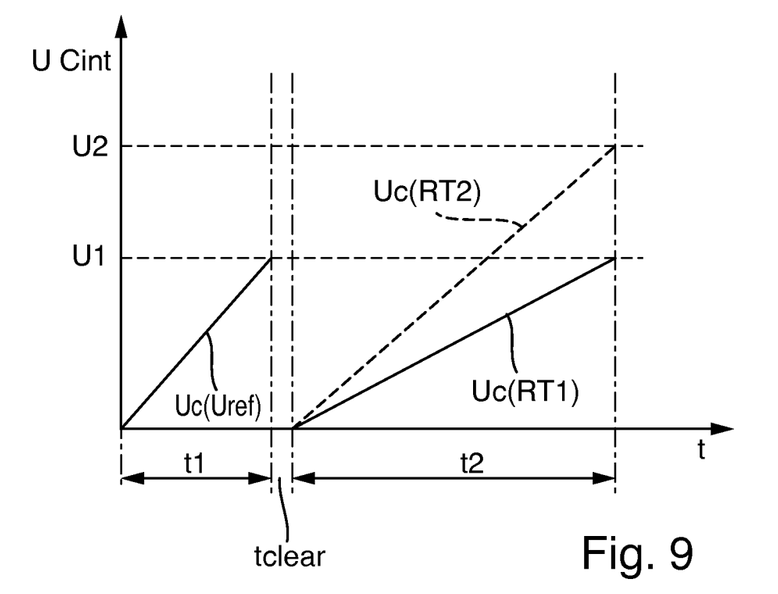

In FIG. 9, the characteristic of the input voltage at the microcontroller 219 is shown for this case, namely both voltages $U_2$ and $U_1$ for the two measuring times t1 and t2.

The two temperature sensors of FIG. 5/6 on the one hand and FIG. 8 on the other hand can be selected according to the criteria mentioned above, namely they should be different from one another in different ways. Furthermore it is to be considered that in the microcontroller in each case only one control for the heating device is connected, see in particular FIG. 1 for that purpose.

The cyclic switching over according to FIG. 2 between the measuring voltages $U_{ref1}$ and $U_{ref2}$ is advantageously indeed effected always with the same time interval, namely at the measuring times 1 and 2. However, this can generally also be variable.

That which is claimed:

1. A temperature measuring device for an electric appliance, said temperature measuring device comprising:
    at least one temperature sensor in the form of an electric resistor, wherein at least two different measuring voltages are applied to said temperature sensor with cyclic switching between said measuring voltages, wherein said temperature sensor is connected to a control, said control comprising a microcontroller and being configured for applying at least two said different measuring voltages to said temperature sensor,
    wherein said control or said microcontroller comprises a memory in which at least a desired temperature characteristic to be expected for said temperature sensor during operation of said electric appliance is stored, wherein said device or said microcontroller is configured for comparing an actual temperature characteristic measured at said temperature sensor to said desired temperature characteristic stored in said control or said microcontroller.

2. The device according to claim 1, wherein at least two temperature sensors are provided in each case with at least one said electric resistor.

3. The device according to claim 2, wherein said temperature sensors are different or non-identical.

4. The device according to claim 2, wherein said temperature sensors are provided of different manufacturers.

5. The device according to claim 2, wherein said temperature sensors or said electric resistors thereof in each case have different resistance values.

6. The device according to claim 2, wherein said temperature sensors have different characteristics in terms of a temperature dependence of their resistance value.

7. The device according to claim 6, wherein a non-linear resistor and a linear resistor are provided, wherein one of said electric resistors of said two temperature sensors is a negative temperature coefficient (NTC) or positive temperature coefficient (PTC) resistor as non-linear resistor.

8. The device according to claim 1, wherein at least two different series resistors upstream of said one or more temperature sensor are provided.

9. The device according to claim 1, wherein a reference resistor as an electric resistor is provided for a temperature sensor, said reference resistor being a reference value for said temperature sensor.

10. The device according to claim 9, wherein multiple different reference resistors are provided and a switching device for switching over between said reference resistors is provided.

11. The device according to claim 1, wherein an integration capacitor, an electric resistor as temperature sensor, a reference resistor and a counting circuit for a circuit of said temperature measuring device are provided.

12. The device according to claim 1, wherein an integrated multiplexer is provided in said control or in said microcontroller.

13. The device according to claim 1, wherein a self-diagnosis in case of safety electronics operated in a self-sustaining manner is provided.

14. The device according to claim 13, wherein information for said self-diagnosis comes from a temperature controller.

15. An electric appliance having said temperature measuring device according to claim 1, said electric appliance comprising an electric heating for a space to be heated, wherein said temperature in said space to be heated, as required together with a medium such as a fluid in said space to be heated, is measured or monitored by means of said temperature sensor.

16. A method for temperature measuring with a temperature measuring device for an electric appliance, said temperature measuring device comprising at least one temperature sensor in the form of an electric resistor, wherein at least two different measuring voltages are applied to said temperature sensor with cyclic switching between said measuring voltages, wherein said temperature sensor is connected to a control, said control comprising a microcontroller and being configured for applying at least two said different measuring voltages to said temperature sensor, the method comprising:

applying, to said temperature sensor, at least two different measuring voltages with cyclic switching between said measuring voltages, wherein said temperature sensor is connected to a control comprising a microcontroller, wherein said control applies said at least two different measuring voltages to said temperature sensor; and said temperature measuring is conducted with said at least one temperature sensor as well as with at least one reference resistor, wherein said reference resistor is used as reference value for an electric resistance of said temperature sensor, wherein in this case said temperature sensor or said reference resistor is operated with cyclic switching between said measuring voltages and another temperature sensor or said reference resistor is operated with a constant measuring voltage for direct temperature measuring, and wherein a comparison of said two measured actual temperature characteristics is effected in said microcontroller.

17. The method according to claim 16, wherein said temperature sensor is operated with two different series resistors.

18. A method for temperature measuring with a temperature measuring device for an electric appliance, said temperature measuring device comprising at least one temperature sensor in the form of an electric resistor, wherein at least two different measuring voltages are applied to said temperature sensor with cyclic switching between said measuring voltages, wherein said temperature sensor is connected to a control, said control comprising a microcontroller and being configured for applying at least two said different measuring voltages to said temperature sensor, the method comprising:

applying, to said temperature sensor, at least two different measuring voltages with cyclic switching between said measuring voltages, wherein said temperature sensor is connected to a control comprising a microcontroller, wherein said control applies said at least two different measuring voltages to said temperature sensor; and comparing an actual temperature characteristic measured at said temperature sensor to a desired temperature characteristic saved in said microcontroller as superposition.

19. The method according to claim 18, wherein an amplitude of said superposition is evaluated for in order to deduce said absolute temperature.

* * * * *